United States Patent
Morgan et al.

(10) Patent No.: US 9,881,702 B2
(45) Date of Patent: Jan. 30, 2018

(54) HYDRAULIC CONTROL UNIT AND METHOD OF SHUTTING DOWN A NUCLEAR REACTOR USING THE SAME

(71) Applicants: Kenneth Allan Morgan, Wilmington, NC (US); Filemon Tecson Cabrera, Wilmington, NC (US); Randy Morris Brown, Wilmington, NC (US)

(72) Inventors: Kenneth Allan Morgan, Wilmington, NC (US); Filemon Tecson Cabrera, Wilmington, NC (US); Randy Morris Brown, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 835 days.

(21) Appl. No.: 14/565,819

(22) Filed: Dec. 10, 2014

(65) Prior Publication Data
US 2016/0358676 A1 Dec. 8, 2016

(51) Int. Cl.
*G21C 7/16* (2006.01)
*G21C 9/02* (2006.01)
(Continued)

(52) U.S. Cl.
CPC ............ *G21C 7/16* (2013.01); *G21C 7/36* (2013.01); *G21C 9/02* (2013.01); *G21D 3/06* (2013.01);
(Continued)

(58) Field of Classification Search
CPC ... G21C 7/16; G21C 7/36; G21C 7/08; G21C 9/02; G21D 3/06; F15B 1/022;
(Continued)

(56) References Cited

U.S. PATENT DOCUMENTS 3,262,820 A * 7/1966 Whitelaw ................ G21C 7/16
376/220
3,940,310 A * 2/1976 Bion ....................... G21C 7/16
376/230
(Continued)

FOREIGN PATENT DOCUMENTS

| FR | 1605326 A | 8/1974 |
| JP | 0252292 A | 2/1990 |
| JP | 2012083200 A | 4/2012 |

OTHER PUBLICATIONS

European Search Report and Opinion issued in connection with corresponding EP Application No. 15198662.7 dated Apr. 18, 2016.

*Primary Examiner* — Jack W Keith
*Assistant Examiner* — Daniel Wasil
(74) *Attorney, Agent, or Firm* — Harness, Dickey & Pierce, P.L.C.

(57) ABSTRACT

A method of shutting down a nuclear reactor may include compressing a scram gas that is in fluid communication with a scram accumulator. The scram accumulator defines a chamber therein and contains bellows within the chamber. The bellows are configured to hold a scram liquid in isolation of the scram gas. The scram gas exerts a compressive force on the bellows in a form of stored energy. The method may additionally include releasing the stored energy in response to a scram signal such that the scram gas expands into the chamber of the scram accumulator to compress the bellows and expel the scram liquid from the scram accumulator to insert control rods into a core of the nuclear reactor.

8 Claims, 4 Drawing Sheets

(51) Int. Cl.
*G21C 7/36* (2006.01)
*G21D 3/06* (2006.01)
*F15B 1/02* (2006.01)
*F15B 1/10* (2006.01)
*G21C 7/08* (2006.01)

(52) U.S. Cl.
CPC ............... *F15B 1/022* (2013.01); *F15B 1/103* (2013.01); *F15B 2201/205* (2013.01); *F15B 2201/3153* (2013.01); *G21C 7/08* (2013.01); *G21Y 2002/40* (2013.01); *G21Y 2004/30* (2013.01); *Y02E 30/40* (2013.01)

(58) Field of Classification Search
CPC ................ F15B 1/103; F15B 2201/205; F15B 2201/3153; G21Y 2002/40; G21Y 2004/30; Y02E 30/40
USPC .......................................................... 376/231
See application file for complete search history.

(56) References Cited

U.S. PATENT DOCUMENTS

| | | | |
|---|---|---|---|
| 4,076,584 A * | 2/1978 | Golden .................... | G21C 7/12 376/231 |
| 4,138,320 A * | 2/1979 | Grantz .................... | G21C 7/16 376/230 |
| 4,997,009 A | 3/1991 | Niikura et al. | |
| 5,128,093 A | 7/1992 | Ose | |

\* cited by examiner

US 9,881,702 B2

HYDRAULIC CONTROL UNIT AND METHOD OF SHUTTING DOWN A NUCLEAR REACTOR USING THE SAME

BACKGROUND

Field

The present disclosure relates to the emergency (and planned) shutdown of a boiling water nuclear reactor (BWR) via the insertion of negative reactivity into the core.

Description of Related Art

In response to a scram signal during the operation of a boiling water nuclear reactor (BWR), a hydraulic control unit shuts down the reactor by inserting neutron-absorbing control rods into the core. In a conventional hydraulic control unit, a control rod is driven into the core by pressurized water that is applied to a metal piston and includes a seal formed by an elastomeric O-ring. However, the conventional piston/O-ring approach may be prone to leaks. As a result, regular maintenance (e.g., changing the elastomeric O-ring) must be performed to ensure proper functionality during a scram operation.

SUMMARY

A hydraulic control unit for a nuclear reactor may include a scram accumulator, a gas supply vessel, and/or a scram valve. The scram accumulator may have a first end with an inlet and an opposing second end with an outlet. The scram accumulator defines a chamber therein and contains bellows within the chamber. The bellows are configured to hold a scram liquid. The bellows have a fixed end and a moveable end. The fixed end of the bellows may be secured to the second end of the scram accumulator. The bellows are configured to transition between an expanded state and a compressed state via the moveable end. The gas supply vessel may be connected to the first end of the scram accumulator. The gas supply vessel is configured to hold a scram gas under pressure and in fluid communication with the chamber of the scram accumulator through the inlet so as to exert a compressive force on the moveable end of the bellows in a form of stored energy. The scram valve may be connected to the second end of the scram accumulator and configured to withstand the compressive force exerted through the bellows to contain the stored energy. The scram valve is configured to open in response to a scram signal to release the stored energy and allow the bellows to yield to the compressive force and transition to the compressed state.

A method of shutting down a nuclear reactor may include compressing a scram gas that is in fluid communication with a scram accumulator. The scram accumulator defines a chamber therein and contains bellows within the chamber. The bellows are configured to hold a scram liquid in isolation of the scram gas. The scram gas exerts a compressive force on the bellows in a form of stored energy. The method may additionally include releasing the stored energy in response to a scram signal such that the scram gas expands into the chamber of the scram accumulator to compress the bellows and expel the scram liquid from the scram accumulator to insert control rods into a core of the nuclear reactor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
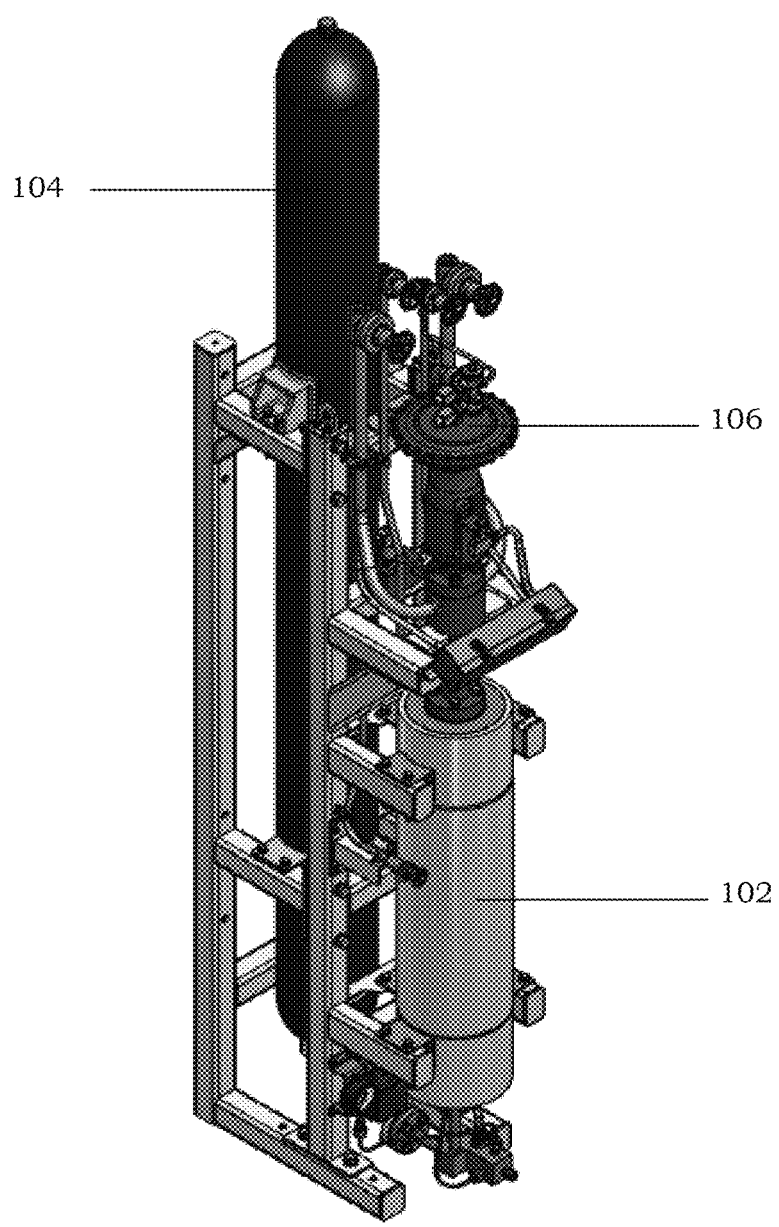
FIG. 1 is a perspective view of a hydraulic control unit according to an example embodiment of the present disclosure.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a hydraulic control unit according to an example embodiment of the present disclosure. Referring to FIG. 1, a hydraulic control unit 100 for a nuclear reactor includes a scram accumulator 102, a gas supply vessel 104, and a scram valve 106. Although not shown, it should be understood that, when the hydraulic control unit 100 is implemented in a nuclear reactor, the scram valve 106 will be operatively connected to a control rod to facilitate the insertion of the control rod into the reactor core during a scram operation.

The scram accumulator 102 has a first end with an inlet and an opposing second end with an outlet. In FIG. 1, the first end of the scram accumulator 102 is at the bottom, and the second end of the scram accumulator 102 is at the top, although example embodiments are not limited thereto. The scram accumulator 102 defines a chamber therein and contains bellows within the chamber. The bellows will be discussed in further detail in connection with FIGS. 2-4. The bellows is configured to hold a scram liquid. The bellows has a fixed end and a moveable end. The fixed end of the bellows is secured to the second end of the scram accumulator. The bellows is configured to transition between an expanded state (e.g., FIG. 2) and a compressed state (e.g., FIG. 3) via the moveable end.

The gas supply vessel 104 is connected to the first end of the scram accumulator 102. The gas supply vessel 104 is configured to hold a scram gas under pressure and in fluid communication with the chamber of the scram accumulator 102 through the inlet so as to exert a compressive force on the moveable end of the bellows in a form of stored energy.

In particular, the gas supply vessel 104 is configured to hold a quantity of the scram gas that is sufficient to transition the bellows within the scram accumulator 102 from the expanded state to the compressed state upon opening of the scram valve 106. For instance, the gas supply vessel 104 may be configured to hold the scram gas such that the pressure within is at least 10 MPa (e.g., at least 15 MPa) prior to a scram operation. The gas supply vessel 104 may also be configured to hold an inert gas as the scram gas. The inert gas may be nitrogen ($N_2$), although example embodiments are not limited thereto.

The scram valve 106 is connected to the second end of the scram accumulator 102 and is configured to withstand all forces (e.g., the compressive force) exerted through the bellows (by the scram gas) to contain the stored energy. The scram valve 106 is a fast opening valve and is configured to open quickly in response to a scram signal to release the stored energy (and, thus, expel the scram liquid from the scram accumulator 102) and allow the bellows in the scram accumulator 102 to yield to the compressive force and transition to the compressed state.

Figure 2:
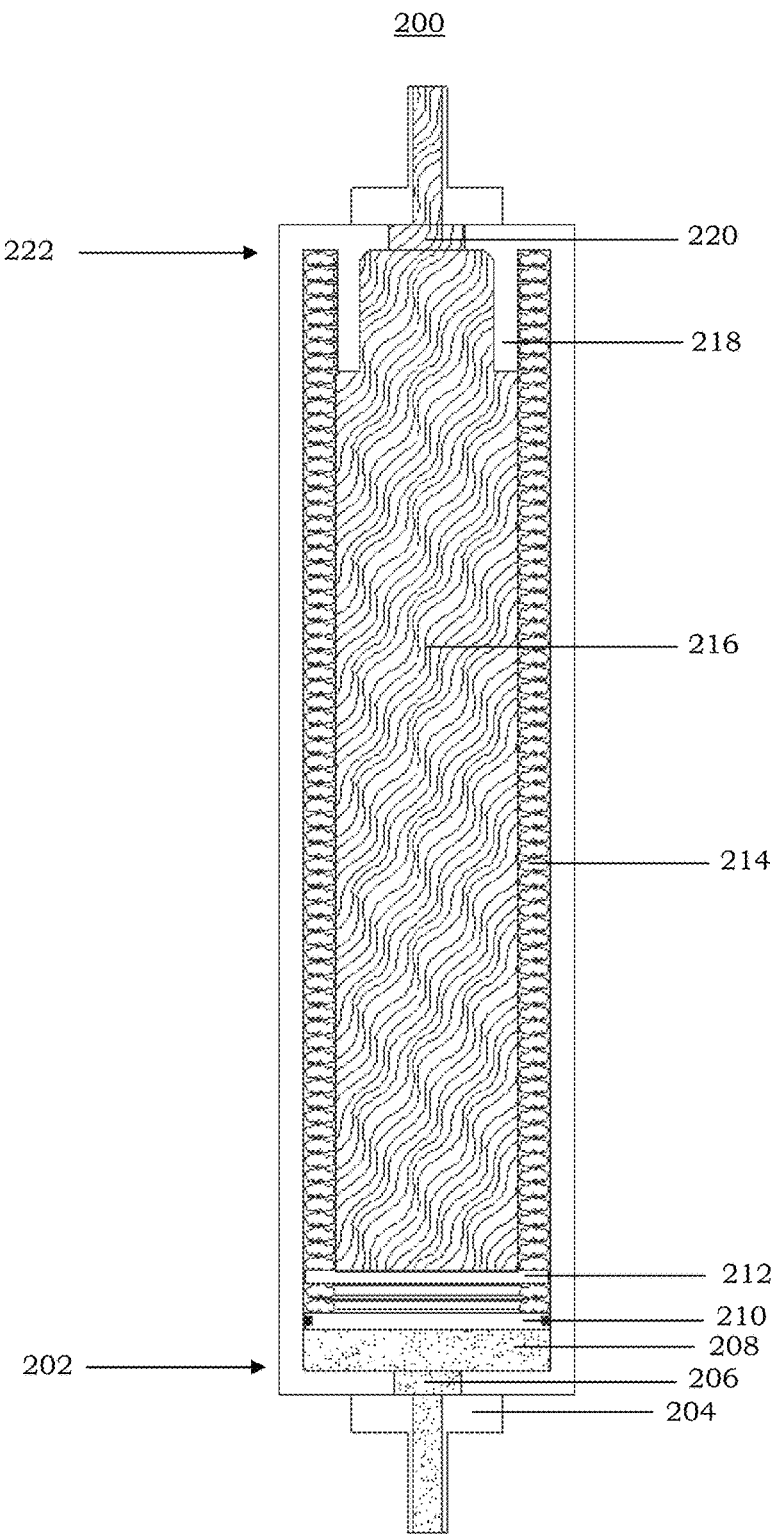
FIG. 2 is a cross-sectional view of a scram accumulator of a hydraulic control unit wherein the bellows therein are in an expanded state according to an example embodiment of the present disclosure.

FIG. 2 is a cross-sectional view of a scram accumulator of a hydraulic control unit wherein the bellows therein are in an expanded state according to an example embodiment of the present disclosure. Referring to FIG. 2, the scram accumulator 200 has a first end 202 with an inlet 206 and an opposing second end 222 with an outlet 220. The scram accumulator 200 also includes an attachment structure 204 at the first end 202 and the second end 222 to facilitate the connection with the gas supply vessel (e.g., gas supply vessel 104 in FIG. 1) and the scram valve (e.g., scram valve 106 in FIG. 1), respectively. The scram accumulator 200 defines a chamber therein and contains bellows 214 within the chamber. The bellows 214 is configured to hold a scram liquid 216. In an example embodiment, the scram liquid 216 is water. The scram accumulator 200 is configured such that the scram liquid 216 is isolated from the scram gas 208 via the bellows 214 so that the scram liquid 216 and the scram gas 208 do not contact each other or intermingle within the chamber.

The bellows 214 has a fixed end and a moveable end. The fixed end of the bellows 214 is secured (e.g., welded) to the second end 222 of the scram accumulator 200. The scram accumulator 200 also includes a stop structure 218 within the chamber at the second end 222. The moveable end of the bellows 214 includes a diffuser plate 210 that is configured to uniformly distribute the compressive force exerted by the scram gas 208 on the moveable end. Additionally, the moveable end of the bellows 214 includes a stop plate 212 that is configured to halt against the stop structure 218 during the compressed state.

In an example embodiment, the scram accumulator 200 may have a cylindrical body that defines a cylindrical chamber therein. In such an embodiment, the bellows 214 may resemble a cylindrical accordion in order to more effectively occupy the chamber within the scram accumulator 200. Additionally, the stop structure 218 may be a pipe-like structure. As a result, the cylindrical body of the scram accumulator 200 and the stop structure 218 may define an annular space therebetween. The annular space may be adjusted to a size that is just sufficient to accommodate the bellows 214 (when expanded and compressed) in order to maximize the available space for the scram liquid 216. The diffuser plate 210 and the stop plate 212 may also be flat, circular structures that resemble a disk in order to correspond to the inner walls of the scram accumulator 200 that define the cylindrical chamber within.

Although not shown, the scram accumulator 200 may further include an anti-rotation device or arrangement to maintain a desired alignment during the compression of the bellows 214 during a scram operation. For instance, the inner walls of the scram accumulator 200 that define the cylindrical chamber may be provided with one or more linear ridges that extend from the first end 202 to the second end 222. In addition, the diffuser plate 210 and the stop plate 212 may be provided with one or more grooves that mate with the one or more linear ridges on the inner walls defining the chamber so as to provide a guided track when the bellows 214 transitions from the expanded state to the compressed state. Conversely, the inner walls of the scram accumulator 200 that define the cylindrical chamber may be provided with one or more linear grooves, while the diffuser plate 210 and the stop plate 212 may be provided with one or more ridges that mate with the one or more linear grooves on the inner walls defining the chamber so as to provide a guided track when the bellows 214 transitions from the expanded state to the compressed state.

The bellows 214 is configured to transition between an expanded state and a compressed state via the moveable end. The scram accumulator 200 is configured such that the moveable end of the bellows 214 is closer to the first end 202 than the second end 222 of the scram accumulator 200 during the expanded state. For instance, the scram accumulator 200 may be configured such that the bellows 214 occupies 80% or more of a volume of the chamber during the expanded state. In an example embodiment, depending on the size of the bellows 214 and the amount of the scram liquid 216 therein, the bellows 214 may fully occupy the volume of the chamber such that the diffuser plate 210 abuts the inlet 206. During the expanded state prior to a scram operation, the scram gas 208 from the gas supply vessel (e.g., gas supply vessel 104 in FIG. 1) exerts pressure on the bellows 214, which in turn exerts pressure on the scram liquid 216 therein which is retained via the scram valve (e.g., scram valve 106 in FIG. 1). The hydraulic control unit, particularly the scram accumulator and scram valve, is designed to be strong enough to contain the forces generated therein and to hold them in equilibrium in the form of stored energy until the proper time for release (e.g., during a scram operation).

Figure 3:
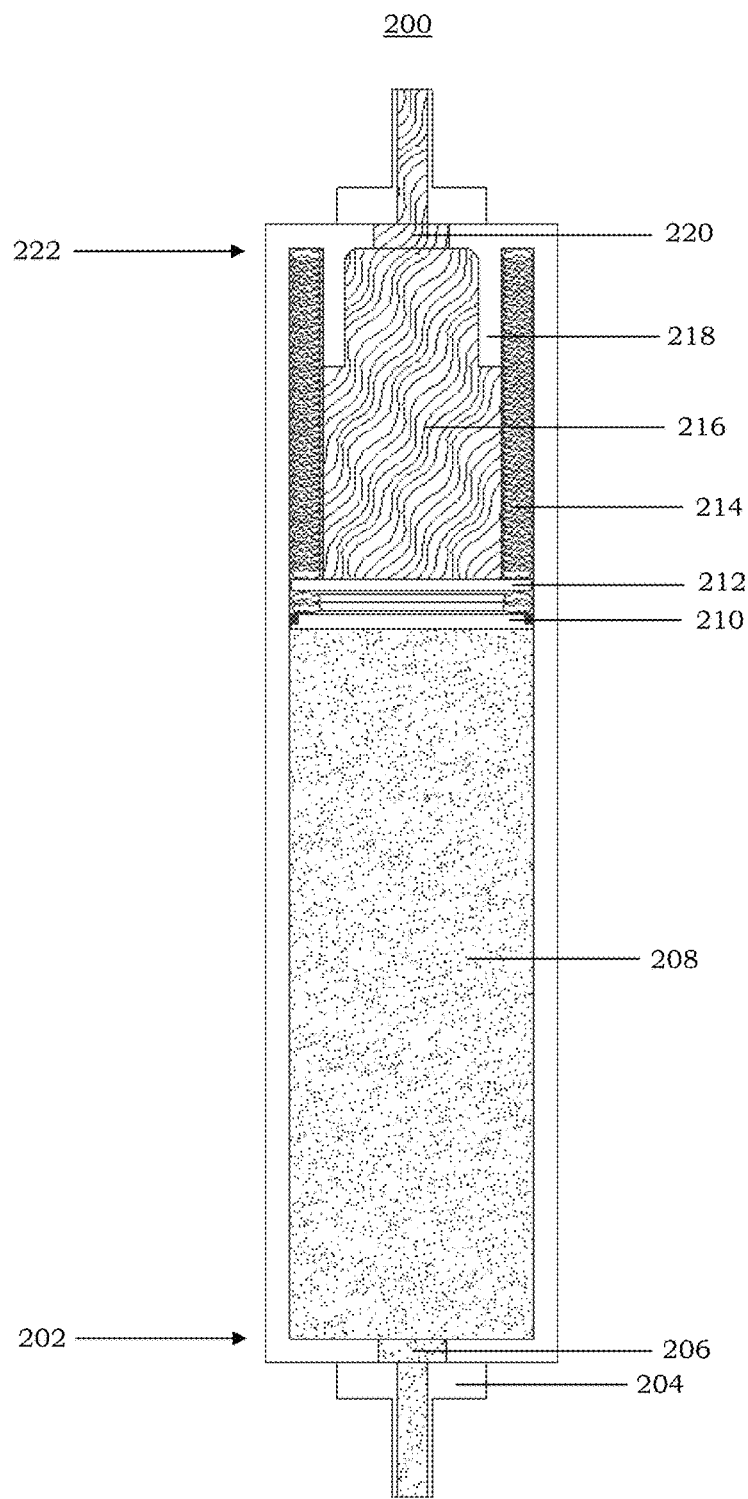
FIG. 3 is a cross-sectional view of a scram accumulator of a hydraulic control unit wherein the bellows therein are in a compressed state according to an example embodiment of the present disclosure.

FIG. 3 is a cross-sectional view of a scram accumulator of a hydraulic control unit wherein the bellows therein are in a compressed state according to an example embodiment of the present disclosure. Referring to FIG. 3, the scram accumulator 200 is configured such that the scram liquid 216 is expelled from the outlet 220 at the second end 222 when the bellows 214 transitions from the expanded state to the compressed state. The scram accumulator 200 is configured such that the moveable end of the bellows 214 is closer to the second end 222 than the first end 202 of the scram accumulator 200 during the compressed state.

Although not shown in FIG. 3, it should be understood that the stop plate 212 of the moveable end of the bellows 214 will be pressed against the stop structure 218 when the bellows 214 has fully transitioned to the compressed state. An O-ring may also be disposed on the rim of the stop structure 218 so as to form a seal when contacted by the stop plate 212. The size (e.g., length) of the stop structure 218 may be adjusted to allow for a full compression (or nearly a full compression) of the bellows 214 in order to maximize the amount of the scram liquid 216 expelled from scram accumulator 200. For instance, the scram accumulator 200 may be configured (e.g., adjusting length of stop structure 218) such that the bellows 214 occupies 30% or less (e.g., 20% or less) of a volume of the chamber during the compressed state.

Figure 4:
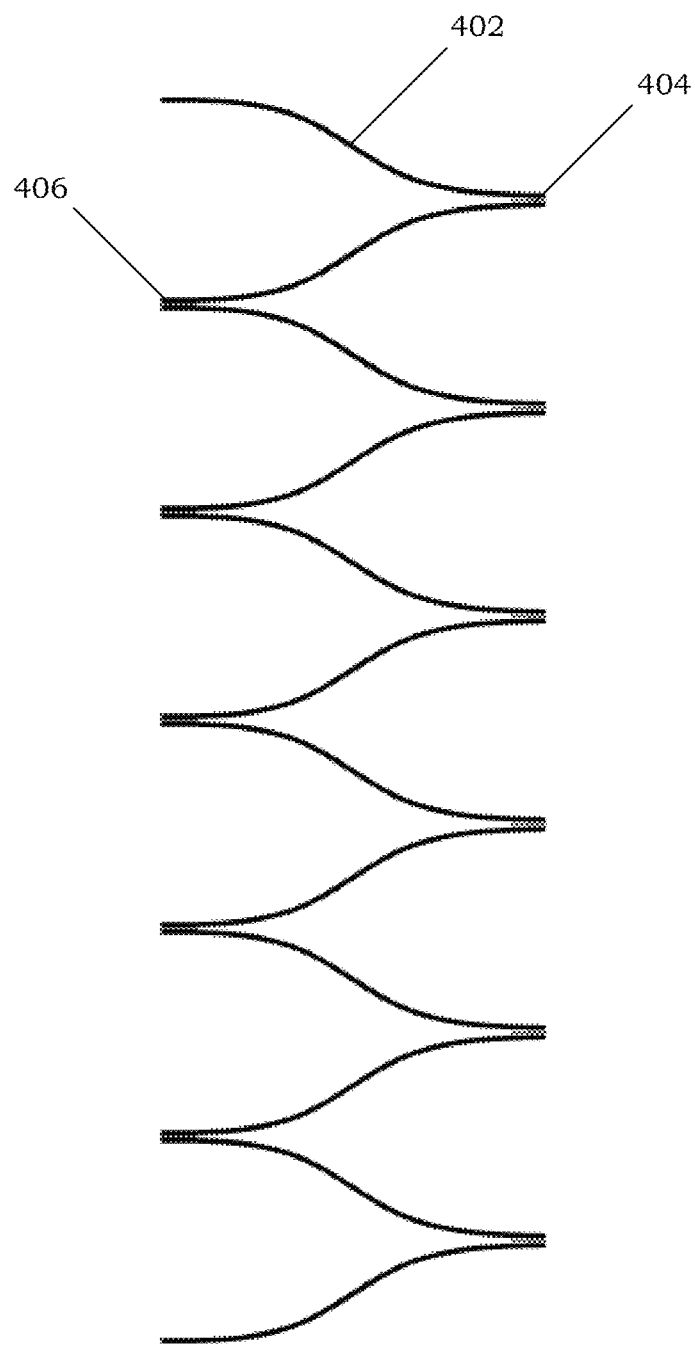
FIG. 4 is an enlarged and partial cross-sectional view of the bellows contained within a scram accumulator of a hydraulic control unit according to an example embodiment of the present disclosure.

FIG. 4 is an enlarged and partial cross-sectional view of the bellows contained within a scram accumulator of a hydraulic control unit according to an example embodiment of the present disclosure. Referring to FIG. 4, the bellows is formed by welding a plurality of annular structures 402 together, wherein the plurality of annular structures 402 may be formed of a suitable metal. The plurality of annular structures 402 resemble flattened rings or thin, gasket-like structures, although the plurality of annular structures 402 may not be completely flat but instead provided with a slight curvature or other shaping. In any event, each of the plurality of annular structures 402 will have an outer diameter edge and an inner diameter edge. In the partial cross-sectional view of FIG. 4, the left side of the drawing corresponds to the inner diameter edges of the annular structures 402 (as well as the bellows), while the right side of the drawing corresponds to the outer diameter edges of the annular structures 402 (as well as the bellows).

To form the bellows, adjacent annular structures 402 are alternately welded by their inner and outer diameters. In particular, referring to FIG. 4, one annular structure 402 is first arranged so as to be a mirror image of an adjacent annular structure 402. The outer diameters of the adjacent annular structures 402 are then welded to form a first weld 404. Next, another annular structure 402 is arranged so as to be a mirror image of one of the two welded annular structures 402. The inner diameters of the adjacent annular structures 402 are then welded to form a second weld 406. Afterwards, another annular structure 402 is arranged so as to be a mirror image of one of the three welded annular structures 402. The outer diameters of the adjacent annular structures 402 are then welded to form a first weld 404. Subsequently, another annular structure 402 is arranged so as to be a mirror image of one of the four welded annular structures 402. The inner diameters of the adjacent annular structures 402 are then welded to form a second weld 406. This approach is repeated as needed to form a bellows of the desired size. When completed, the bellows will resemble a cylindrical accordion. Notably, the bellows will have a double-welded structure, which is not only durable but is also able to compress/collapse to a greater degree than conventional bellows which are obtained by molding or bending.

As mentioned above, the present hydraulic control unit may be used to shut down a nuclear reactor during an emergency or for a planned outage. Referring back to FIGS. 2-3, a method of shutting down a nuclear reactor may include compressing a scram gas 208 that is in fluid communication with a scram accumulator 200. The compressing may include filling a gas supply vessel (e.g., gas supply vessel 104 in FIG. 1) with the scram gas 208, wherein the gas supply vessel is in fluid communication with the chamber of the scram accumulator 200. In addition, the compressing may be performed to a pressure of at least 10 MPa (e.g., at least 15 MPa).

The scram accumulator 200 defines a chamber therein and contains bellows 214 within the chamber. The bellows 214 are configured to hold a scram liquid 216 in isolation of the scram gas 208. In particular, the bellows 214 form a fluid-tight partition between the scram gas 208 and the scram liquid 216. As a result, during proper operation, the scram gas 208 will not exit through the outlet 220, and the scram liquid 216 will not exit through the inlet 206. Because the scram gas 208 is pressurized, the scram gas 208 exerts a compressive force on the bellows 214 in a form of stored energy.

The method additionally includes releasing the stored energy in response to a scram signal such that the scram gas 208 expands into the chamber of the scram accumulator 200 to compress the bellows 214 and expel the scram liquid 216 from the scram accumulator 200 to insert control rods into a core of the nuclear reactor. The releasing may include opening a scram valve (e.g., scram valve 106 in FIG. 1) that is attached to the scram accumulator 200 so that the bellows 214 is able to yield to the compressive force exerted by the scram gas 208. In particular, the releasing may include the scram gas 208 entering the scram accumulator 200 from a first end 202, while the scram liquid 216 exits from an opposing second end 222 of the scram accumulator 200. As a result, the bellows 214 will collapse along a lengthwise direction of the chamber towards the second end 222. In an example embodiment, the scram gas 208 will decrease a volume of the bellows 214 by 70% or more (e.g., 80% or more).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of shutting down a nuclear reactor, comprising:
   compressing a scram gas that is in fluid communication with a scram accumulator, the scram accumulator defining a chamber therein and containing bellows within the chamber, the bellows configured to hold a scram liquid in isolation of the scram gas, the scram gas exerting a compressive force on the bellows in a form of stored energy; and
   releasing the stored energy in response to a scram signal such that the scram gas expands into the chamber of the scram accumulator to compress the bellows and expel the scram liquid from the scram accumulator to insert control rods into a core of the nuclear reactor.

2. The method of claim 1, wherein the compressing includes filling a gas supply vessel with the scram gas, the gas supply vessel being in fluid communication with the chamber of the scram accumulator.

3. The method of claim 1, wherein the compressing is performed to a pressure of at least 10 MPa.

4. The method of claim 1, wherein the compressing includes the bellows forming a fluid-tight partition between the scram gas and the scram liquid.

5. The method of claim 1, wherein the releasing includes opening a scram valve that is attached to the scram accumulator so that the bellows is able to yield to the compressive force exerted by the scram gas.

6. The method of claim 1, wherein the releasing includes the scram gas entering the scram accumulator from a first end while the scram liquid exits from an opposing second end of the scram accumulator.

7. The method of claim 1, wherein the releasing includes collapsing the bellows along a lengthwise direction of the chamber.

8. The method of claim 1, wherein the releasing includes the scram gas decreasing a volume of the bellows by 80% or more.

* * * * *